United States Patent

Bauer et al.

[11] Patent Number: 5,873,599
[45] Date of Patent: Feb. 23, 1999

[54] APPARATUS FOR PRETENSIONING SEAT BELT WEBBING

[75] Inventors: Barney J. Bauer, Fenton; Kevin M. Gillis, Shelby Township; Louis R. Brown, Oxford, all of Mich.

[73] Assignee: TRW Vehicle Safety Systems Inc., Lyndhurst, Ohio

[21] Appl. No.: 855,412

[22] Filed: May 13, 1997

[51] Int. Cl.⁶ .......................... B60R 22/46; B60R 22/48
[52] U.S. Cl. .......................... 280/806; 297/480; 180/273
[58] Field of Search ..................... 280/806, 735; 242/374; 297/480; 180/273, 268

[56] References Cited

U.S. PATENT DOCUMENTS

| 5,071,160 | 12/1991 | White et al. | 280/735 |
|---|---|---|---|
| 5,398,185 | 3/1995 | Omura | 280/735 |
| 5,407,148 | 4/1995 | Ono et al. | 242/374 |
| 5,413,378 | 5/1995 | Steffens, Jr. et al. | 280/735 |
| 5,415,431 | 5/1995 | Omura | 280/806 |
| 5,496,068 | 3/1996 | Ball et al. | 280/806 |
| 5,615,917 | 4/1997 | Bauer | 280/806 |

FOREIGN PATENT DOCUMENTS

| 42 17 969 | 12/1993 | Germany | 280/806 |

*Primary Examiner*—Peter C. English
*Attorney, Agent, or Firm*—Tarolli, Sundheim, Covell, Tummino & Szabo

[57] ABSTRACT

An apparatus (40) for pretensioning seat belt webbing (16) which is extensible about an occupant of a vehicle seat (14) has at least two different output levels. Sensors (110, 120, 130) sense at least one characteristic of the occupant of the vehicle seat (14). A controller (100) is operatively connected to the sensors (110, 120, 130) for controlling the output level of the pretensioning apparatus (40) based on the characteristics of the occupant sensed by the sensors. The at least two output levels of the pretensioning apparatus (40) correspond to respective levels of force applied to the seat belt webbing (16) which in turn correspond to respective levels of force imposed on the vehicle occupant by the seat belt webbing.

18 Claims, 2 Drawing Sheets

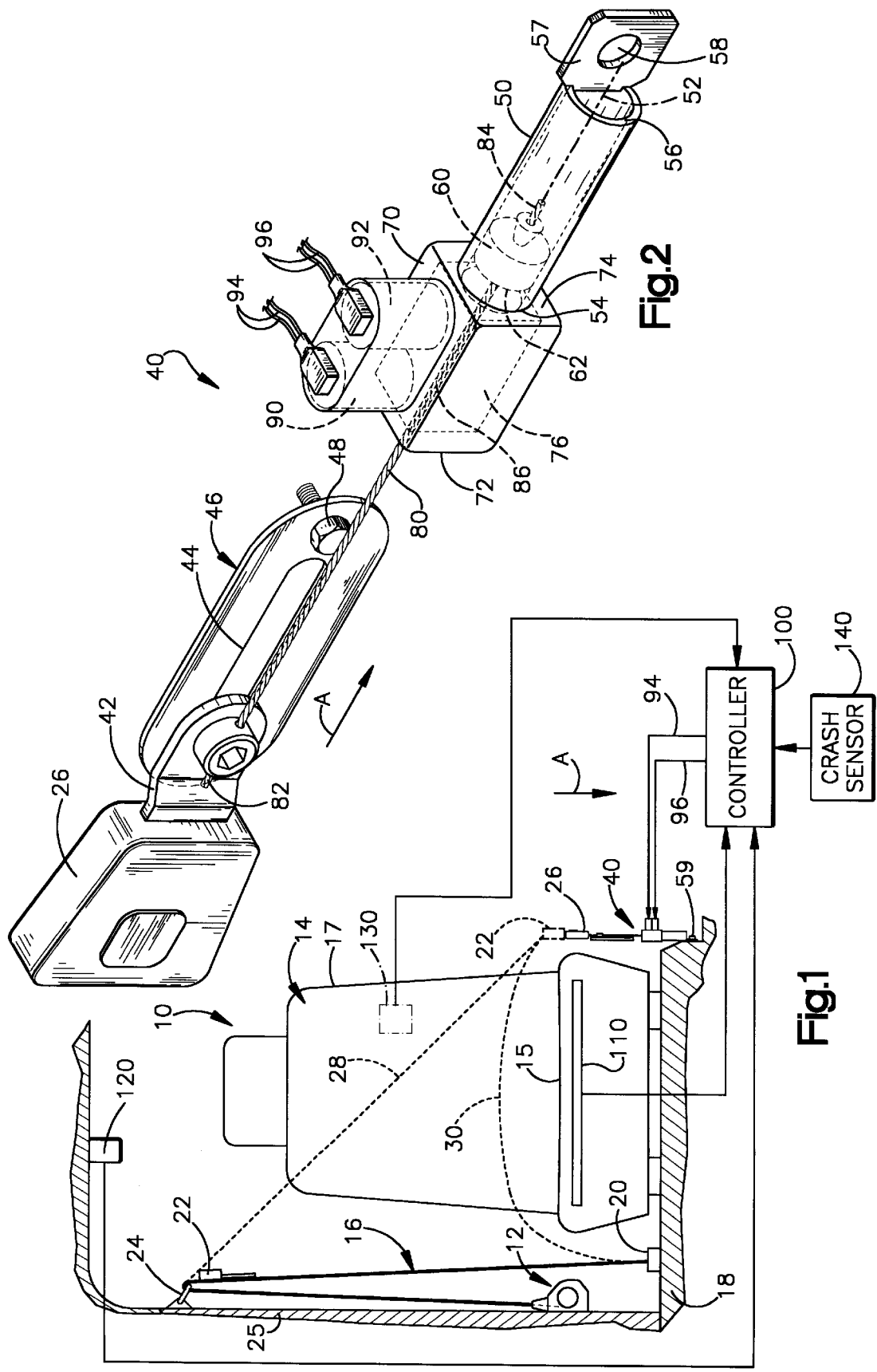

APPARATUS FOR PRETENSIONING SEAT BELT WEBBING

BACKGROUND OF THE INVENTION

1. Technical Field

The present invention relates to an apparatus for helping to protect a vehicle occupant. In particular, the present invention relates to a seat belt webbing pretensioner apparatus which has a variable output based on sensed characteristics of an occupant of a vehicle seat.

2. Description of the Prior Art

A typical vehicle seat belt system includes a length of seat belt webbing wound on a spool of a seat belt webbing retractor. The seat belt webbing is extensible about a vehicle occupant to help protect the occupant. The spool rotates in a belt webbing withdrawal direction as the seat belt webbing is withdrawn from the retractor. In the event of a vehicle collision, the spool is prevented from rotating in the belt webbing withdrawal direction.

It is known to pretension, or remove any slack in, the seat belt webbing in the event of a collision. In one known seat belt webbing system, the seat belt webbing is pretensioned by moving a buckle associated with the seat belt webbing through a pretensioning stroke. The force of the pretensioning stroke is typically large enough so that, for an average male occupant, any slack in the seat belt webbing is removed. A variety of pretensioning force levels may be desirable to uniformly restrain all sizes of occupants.

SUMMARY OF THE INVENTION

The present invention is an apparatus comprising pretensioning means for pretensioning seat belt webbing which is extensible about an occupant of a vehicle seat. The pretensioning means has means for providing at least two different output levels. Sensing means is provided for sensing at least one characteristic of an occupant of the vehicle seat. Controlling means, which is operatively connected to the sensing means, is provided for controlling the output level of the pretensioning means based on the sensed characteristic of the occupant.

The at least two output levels of the pretensioning means correspond to respective levels of force applied to the seat belt webbing which in turn correspond to respective levels of force imposed on the vehicle occupant by the seat belt webbing.

According to one feature of the present invention, the sensing means senses the weight of the occupant and provides a signal to the controlling means indicative of the sensed weight of the occupant.

According to another feature of the present invention, the sensing means senses the height of the occupant and provides a signal to the controlling means indicative of the sensed height of the occupant.

According to yet another feature of the present invention, the sensing means senses the position of the occupant in the vehicle seat and provides a signal to the controlling means indicative of the sensed position of the occupant.

In accordance with still another feature of the present invention, the sensing means includes means for sensing the weight of the occupant, means for sensing the height of the occupant, and means for sensing the position of the occupant in the vehicle seat. The controlling means is operable to (i) receive signals from the sensing means indicative of the weight, the height and the position of the occupant, (ii) determine which of the at least two output levels for the pretensioning means is appropriate for the occupant, and (iii) actuate the pretensioning means in accordance with the determined appropriate output level.

The means for providing at least two different output levels comprises at least two independently actuatable pyrotechnic charges. Each of the at least two pyrotechnic charges is electrically actuated by the controlling means for one output level and only one of the at least two pyrotechnic charges is electrically actuated by the controlling means for the other output level.

The pretensioning means includes a movable piston in a cylinder and a housing attached to the cylinder. A chamber is defined in the housing. The piston is initially disposed adjacent the chamber in the housing and is coupled to the seat belt webbing by a coupling member. The at least two pyrotechnic charges are in fluid communication with the chamber and are independently actuatable to move the piston in the cylinder. The coupling member transmits movement of the piston into movement of the seat belt webbing to pretension the seat belt webbing in the event of a vehicle collision.

BRIEF DESCRIPTION OF THE DRAWINGS

Further features of the present invention will become apparent to one skilled in the art to which the present invention relates from reading the following specification with reference to the accompanying drawings, in which:

FIG. 1 is a schematic illustration of a vehicle seat belt system including an apparatus for pretensioning seat belt webbing constructed in accordance with the present invention;

FIG. 2 is a perspective view of a portion of the pretensioner apparatus of FIG. 1.

DESCRIPTION OF PREFERRED EMBODIMENTS

Figure 3:
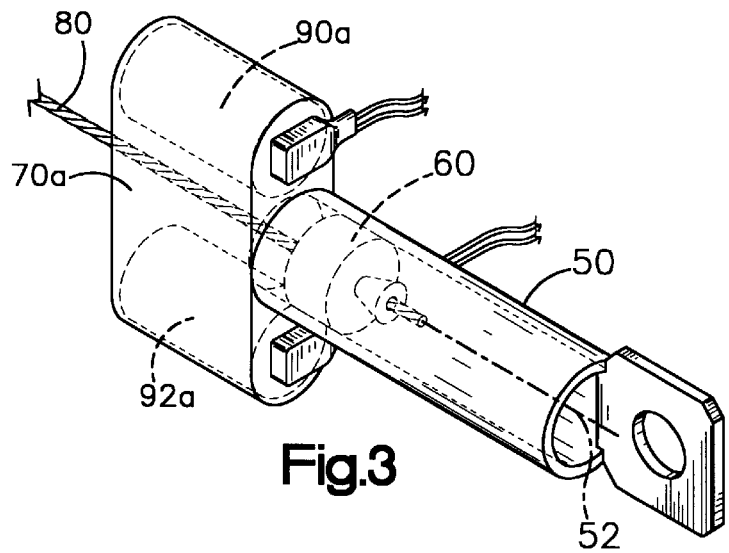
FIGS. 3–5 are views similar to FIG. 2 showing modified embodiments of the present invention.

The present invention relates to a vehicle seat belt system for helping to protect an occupant of a vehicle. The present invention is particularly directed to a pretensioner apparatus which has a variable output based on sensed characteristics of an occupant of a vehicle seat. The present invention is applicable to various seat belt system constructions. As representative of the present invention, FIG. 1 illustrates a three-point continuous loop seat belt system 10 for use in restraining an occupant of a vehicle. The seat belt system 10 includes a seat belt webbing retractor 12.

During operation of the vehicle, the occupant of the vehicle sits on a vehicle seat 14 which is illustrated as a front passenger seat in the vehicle. The vehicle seat 14 has a seat bottom cushion 15 and a seat back 17. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 12 which is secured to the vehicle body on the same side of the seat 14. Intermediate its ends, the belt webbing 16 passes through a tongue assembly 22 and a D-ring 24 that is mounted to a B-pillar 25 above the retractor 12 and the anchor point 20. When the seat belt system 10 is not in use, the belt webbing 16 is wound on the retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 30 which extends across the lap of the occupant.

A pretensioner apparatus 40 is provided which is operable to remove slack from the seat belt webbing 16 in the event of sudden vehicle deceleration, such as occurs in a vehicle collision. As shown in FIG. 2, the pretensioner apparatus 40 includes a slide 42 which is fixedly connected to the buckle 26. The slide 42 is movable along a longitudinal slot 44 in an anchor plate 46. The anchor plate 46 is secured to the vehicle body 18 by a bolt 48.

The pretensioner apparatus 40 further includes a cylinder 50, a piston 60 in the cylinder, and a housing 70 attached to the cylinder. The cylinder 50 has an axial centerline 52 and first and second ends 54 and 56, respectively. A planar mounting flange 57 extends from the second end 56 of the cylinder 50. The mounting flange 57 has a centrally located opening 58 for receiving a bolt 59 (FIG. 1) to secure the cylinder 50 to the vehicle body 18. The cylinder 50 is shown oriented vertically in FIG. 1, but the cylinder could be oriented horizontally or at an angle between horizontal and vertical.

The piston 60 is movable in the cylinder 50 between a first position adjacent the first end 54 of the cylinder and a second position adjacent the second end 56 of the cylinder. A pressure side 62 of the piston 60 faces the first end 54 of the cylinder 50.

The housing 70 has a first end wall 72 and a second end wall 74. The first end wall 72 of the housing 70 includes a small cable opening (not shown). The second end wall 74 of the housing 70 includes a large fluid opening (not shown) which has a slightly larger diameter than the outside diameter of the cylinder 50. The first end 54 of the cylinder 50 fits into the fluid opening in the second end wall 74 of the housing 70 and is attached to the second end wall by a suitable means such as an annular weld (not shown). A chamber 76 is defined inside the housing 70 between the first and second end walls 72 and 74. The pressure side 62 of the piston 60 faces toward and is in fluid communication with the chamber 76 through the fluid opening in the second end wall 74 of the housing 70.

A cable 80 couples the slide 42 for movement with the piston 60. A first end portion 82 of the cable 80 is connected to the slide 42 and a second end portion 84 of the cable is connected to the piston 60. The cable 80 extends through the cable opening in the first end wall 72 of the housing 70 and through the fluid opening in the second end wall 74 of the housing. An intermediate portion 86 of the cable 80 is disposed in the chamber 76 in the housing 70.

The pretensioner apparatus 40 includes first and second pyrotechnic charges 90 and 92, respectively. The pyrotechnic charges 90 and 92 are independently mounted to the housing 70 and are in fluid communication with the chamber 76 in the housing. The pyrotechnic charges 90 and 92 are arranged adjacent to one another and are oriented at right angles to the axial centerline 52 of the cylinder 50.

Each pyrotechnic charge 90, 92 is independently electrically actuatable over lead wires 94 and 96, respectively. Each of the pyrotechnic charges 90 and 92 includes an explosive material which, when actuated by electric current, ignites and combusts to increase the pressure inside the chamber 76. In the preferred embodiment shown, the pyrotechnic charges 90 and 92 are substantially similar in output capacity. It is contemplated that the first and second pyrotechnic charges 90 and 92 could have a different output capacity from each other. It is further contemplated that additional (more than two) pyrotechnic charges could be mounted to the housing 70 of the pretensioner apparatus 40.

Because the pretensioner apparatus 40 has two independently actuatable pyrotechnic charges 90 and 92, the pretensioner apparatus has at least two output levels. Specifically, if only one of the two pyrotechnic charges 90 and 92 is actuated, a first output level for the pretensioner apparatus 40 is realized. If both of the pyrotechnic charges 90 and 92 are actuated, a second output level for the pretensioner apparatus 40, which is greater than the first output level, is realized. If the two pyrotechnic charges 90 and 92 have different output capacities, three different output levels for the pretensioner apparatus 40 can be provided.

The pretensioner apparatus 40 (FIG. 1) includes a system controller 100. The system controller 100 is mounted in the vehicle and is electrically connected to the pyrotechnic charges 90 and 92 by the lead wires 94 and 96, respectively. The system controller 100 preferably comprises a microcomputer.

The pretensioner apparatus 40 also includes a plurality of sensors for sensing characteristics of a vehicle occupant. The plurality of sensors includes a weight sensor 110, a height sensor 120, and a position sensor 130. The weight sensor 110 is located in the seat bottom cushion 15 of the vehicle seat 14 and is electrically connected to the system controller 100. The weight sensor 110 senses the weight of the occupant of the vehicle seat 14 and sends a signal to the controller 100 indicative of the sensed weight.

The height sensor 120 is mounted to the roof of the vehicle and is electrically connected to the system controller 100. The height sensor 120 may be an ultrasonic sensor, an infrared sensor, or another type of sensor. The height sensor 120 senses the height of the occupant of the vehicle seat 14 and sends a signal to the system controller 100 indicative of sensed height. The height sensor 120 could, alternatively, be mounted to another part of the vehicle such as the vehicle instrument panel, the B-pillar 25, the seat back 17, or the vehicle door.

The position sensor 130 is mounted in the vehicle instrument panel (not shown) and is electrically connected to the system controller 100. The position sensor 130 may be an ultrasonic sensor, an infrared sensor, or another type of sensor. The position sensor 130 senses the position of the occupant in the vehicle seat 14 and sends a signal to the system controller 100 indicative of sensed position. The position sensor 130 could, alternatively, be located in another part of the vehicle such as the vehicle door, the B-pillar 25, or the seat back 17.

A crash sensor 140 mounted on the vehicle body 18 is also electrically connected to the system controller 100. The crash sensor 140 senses conditions indicative of a vehicle collision, such as sudden vehicle deceleration, and sends a signal to the system controller 100.

When the vehicle ignition system is turned on, the pretensioner apparatus 40 is energized. The sensors 110, 120 and 130 begin sensing their respective occupant characteristics and providing appropriate signals to the system controller 100. The signals from the sensors 110, 120, and 130 are continuously transmitted to the system controller 100, which continuously stores the signals received from each of the sensors in an internal memory. The system controller 100 analyzes the signals which correspond to characteristics of the occupant to determine whether, in the event of a collision detection signal from the crash sensor 140, one or both of the pyrotechnic charges 90 and 92 should be actuated. The system controller 100 continuously performs this decision process and thus is always ready to actuate one or both of the pyrotechnic charges 90 and 92 according to the specific sensed characteristics of the occupant.

Under normal driving conditions, the slide 42 (FIG. 2) connected to the seat belt buckle 26 is frictionally held in an upper portion of the slot 44 in the anchor plate 46. The piston 60 inside the cylinder 50 is in its first position adjacent the first end 54 of the cylinder. The cable 80 which interconnects the piston 60 and the slide 42 is taut.

In the event of sudden vehicle deceleration such as occurs in a collision, the crash sensor 140 signals the system controller 100 accordingly. The system controller 100 then actuates one or both of the pyrotechnic charges 90 and 92, in accordance with the most recent sensed characteristics of the occupant. For example, if the weight sensor 110 has most recently provided the system controller 100 with information that the occupant of the seat 14 is relatively heavy, then the system controller may decide, on the basis of its internal programming, that the second (or higher) output level of the pretensioner apparatus 40 is necessary. If this decision is made, then both pyrotechnic charges 90 and 92 are actuated. On the other hand, if the weight sensor has most recently provided the system controller 100 with information that the occupant of the seat 14 is relatively light, then the system controller may decide, on the basis of its internal programming, that the first (or lower) output level of the pretensioner apparatus 40 is preferable. If this decision is made, then only one of the pyrotechnic charges 90 and 92 is actuated.

Another example of the decision process made by the system controller 100 involves the height sensor 120. If the height sensor 120 provides the system controller 100 with information that the occupant of the seat 14 is relatively tall (indicative of a large adult), the system controller may decide that the higher output level is necessary and, as a result, actuate both pyrotechnic charges 90 and 92. Conversely, if the height sensor 120 provides the system controller 100 with information that the occupant of the seat 14 is relatively short (indicative of a small adult or large child), the system controller may decide that the lower output level is preferable and thus actuate only one of the pyrotechnic charges 90 and 92.

A further example of the decision process made by the system controller 100 involves the position sensor 130. If the position sensor 130 provides the system controller 100 with information that the occupant of the seat 14 is out-of-position in the seat (for example, leaning forward), the system controller may decide that the higher output level is necessary and actuate both pyrotechnic charges 90 and 92 in order to more rigidly restrain the occupant in the seat. Conversely, if the position sensor 130 provides the system controller 100 with information that the occupant of the seat 14 is properly seated in the seat, the system controller may decide that the lower output level is preferable and thus actuate only one of the pyrotechnic charges 90 and 92 in order simply to remove any slack in the seat belt webbing rather than to pull the occupant against the seat back 17.

The system controller 100 can also decide whether to actuate one or both of the pyrotechnic charges 90 and 92 according to all of the sensed characteristics received from each of the sensors 110, 120 and 130. That is, the system controller 100 can consider each characteristic of the occupant as one factor of many and then determine, on the basis of all the factors, the appropriate output level for the pretensioner apparatus 40.

When one or both of the pyrotechnic charges 90 and 92 is actuated by an electric current from the system controller 100, the resulting combustion products produce a significant increase in pressure inside the chamber 76 in the housing 70. The pressure in the chamber 76 applies force against the pressure side 62 of the piston 60 and causes the piston to be moved inside the cylinder 50 from its first position adjacent the first end 54 of the cylinder to its second position adjacent the second end 56 of the cylinder. As the piston 60 moves in the cylinder 50, the cable 80 is pulled along with the piston. This pulling of the cable 80 causes the slide 42, to which the cable is connected, to be pulled downward in the slot 44 in the anchor plate 46, in the direction indicated by the arrow A (FIGS. 1 and 2). The downward movement of the slide 42 pulls the seat belt buckle 26 and the tongue assembly 22 downward, thus tightening the seat belt webbing 16. Slack in the seat belt webbing 16 is thus removed. After the pretensioning action is completed, the tongue 22, the buckle 26, and the cable 80 are secured in their displaced position by a known clutch mechanism that is attached to the piston 60.

There is a direct correlation between the force due to the increased pressure inside the chamber 76 in the housing 70 and the pretensioning force which is imposed on the occupant by the seat belt webbing 16. When only one of the pyrotechnic charges 90 and 92 is actuated, a relatively small increase in pressure occurs in the chamber 76, which results in a lower level of pretensioning force being applied to the cable 80 and, thus, to the belt webbing 16. When both of the pyrotechnic charges 90 and 92 are actuated, a relatively large increase in pressure occurs in the chamber 76, which results in a higher level of pretensioning force being applied to the belt webbing 16.

Figure 4:
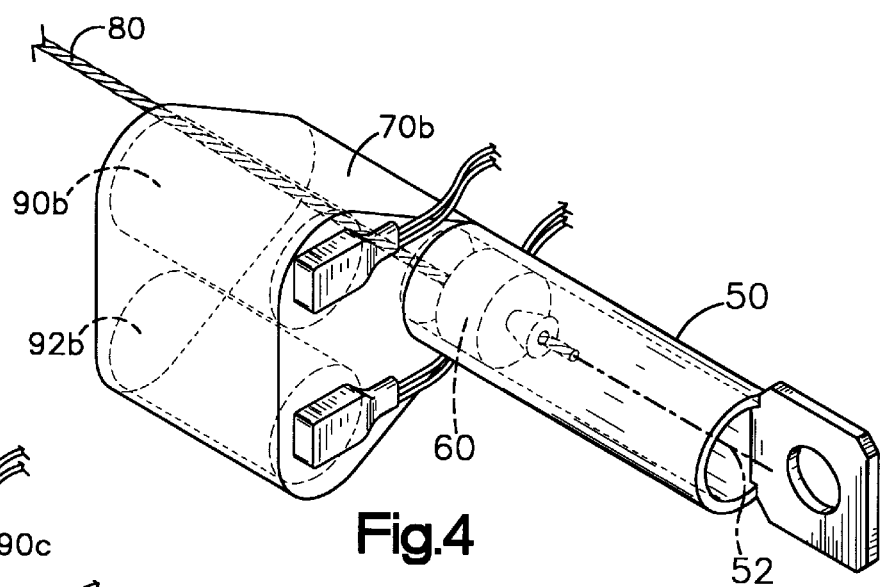
Figure 5:
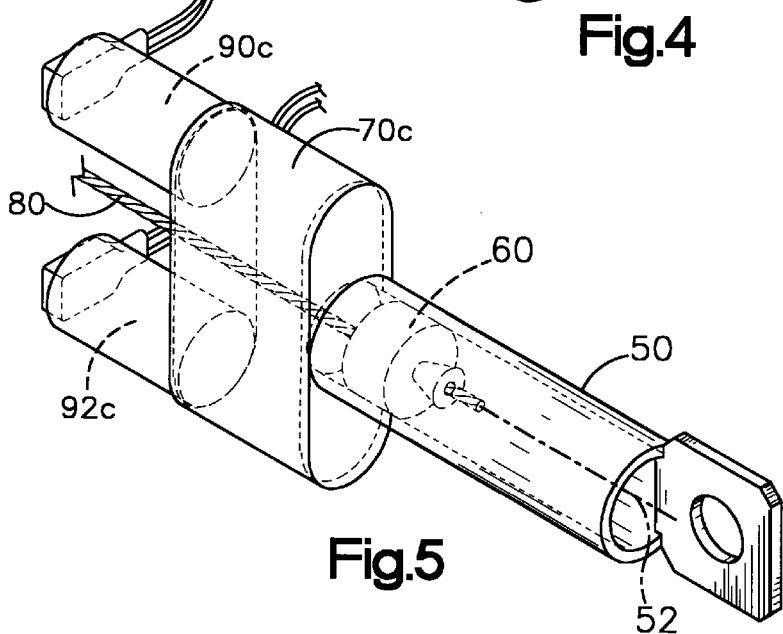

As shown in the modified embodiments of FIGS. 3–5, the pyrotechnic charges 90 and 92 can be arranged in parallel with the axial centerline 52 of the cylinder 50. In the embodiment of FIG. 3, the pyrotechnic charges 90a and 92a mounted to the housing 70a are spaced 180° apart about the cylinder 50. In the embodiment of FIG. 4, the pyrotechnic charges 90b and 92b mounted to the housing 70b are arranged adjacent to one another. In the embodiment of FIG. 5, the pyrotechnic charges 90c and 92c mounted to the housing 70c extend away from the housing 70c over a portion of the cable 80.

From the above description of the invention, those skilled in the art will perceive improvements, changes and modifications in the invention. For example, a seat belt buckle sensor could be added to the pretensioner apparatus 40 to indicate whether or not the seat belt is buckled so that the system controller 100 does not actuate the pyrotechnic charges 90 and 92 if the seat belt is not being worn by the vehicle occupant. Also, if the system controller 100 does not receive a signal from one or more of the sensors 110, 120 and 130, thus indicating that the seat 14 is not occupied, then the system controller may decide, based on its internal programming, not to actuate either of the pyrotechnic charges 90 and 92. Further, the apparatus can also be applied to a retractor or anchorage-type pretensioning system. Such improvements, changes and modifications within the skill in the art are intended to be covered by the appended claims.

Having described the invention, we claim:

1. An apparatus comprising:

pretensioning means for pretensioning seat belt webbing which is extensible about an occupant of a vehicle seat, said pretensioning means having means for providing at least two different output levels;

sensing means for sensing at least one characteristic of an occupant of the vehicle seat; and controlling means operatively connected to said sensing means for controlling the output level of said pretensioning means based on the sensed characteristic of the occupant, said means for providing at least two different output levels comprising at least two independently actuatable pyrotechnic charges.

2. The apparatus as set forth in claim 1 wherein the at least two output levels of said pretensioning means correspond to respective levels of force applied to the seat belt webbing which in turn correspond to respective levels of force imposed on the occupant by the seat belt webbing.

3. The apparatus as set forth in claim 1 wherein said sensing means senses the weight of the occupant and provides a signal to said controlling means indicative of the sensed weight of the occupant.

4. The apparatus as set forth in claim 1 wherein said sensing means senses the height of the occupant and provides a signal to said controlling means indicative of the sensed height of the occupant.

5. The apparatus as set forth in claim 1 wherein said sensing means senses the position of the occupant in the vehicle seat and provides a signal to said controlling means indicative of the sensed position of the occupant.

6. The apparatus as set forth in claim 1 wherein said sensing means includes means for sensing the weight of the occupant, means for sensing the height of the occupant, and means for sensing the position of the occupant in the vehicle seat;

said controlling means being operable to (i) receive signals from said sensing means indicative of the weight, the height and the position of the occupant, (ii) determine which of said at least two output levels for said pretensioning means is appropriate for the occupant, and (iii) actuate said pretensioning means in accordance with the determined appropriate output level.

7. The apparatus as set forth in claim 1 wherein said controlling means comprises a microcomputer.

8. The apparatus as set forth in claim 1 wherein each of said at least two pyrotechnic charges is electrically actuated by said controlling means for one output level and only one of said at least two pyrotechnic charges is electrically actuated by said controlling means for the other output level.

9. The apparatus as set forth in claim 1 wherein said pretensioning means includes a piston movable in a cylinder and a housing attached to said cylinder, a chamber being defined in said housing, said piston being initially disposed adjacent said chamber in said housing and being coupled to the seat belt webbing by a coupling member, said at least two pyrotechnic charges being in fluid communication with said chamber and being independently actuatable to move said piston in said cylinder, said coupling member transmitting movement of said piston into movement of the seat belt webbing to pretension the seat belt webbing in the event of a vehicle collision.

10. An apparatus for pretensioning seat belt webbing which is extensible about an occupant of a seat in a vehicle, said apparatus comprising:

a cylinder having a first end and a second end;

a housing attached to said first end of said cylinder, a chamber being defined in said housing;

a piston in said cylinder and in fluid communication with said chamber in said housing, said piston being movable from a first position adjacent said first end of said cylinder to a second position adjacent said second end of said cylinder;

coupling means for coupling said piston to the seat belt webbing, a portion of said coupling means extending through said chamber in said housing, said coupling means transmitting movement of said piston into movement of the seat belt webbing to pretension the seat belt webbing in the event of a vehicle collision;

moving means for moving said piston in said cylinder, said moving means including at least two independently actuatable pyrotechnic charges connected with said housing and in fluid communication with said chamber in said housing, the actuation of one of said pyrotechnic charges corresponding to a first output level for said moving means and causing said piston to be moved from said first position in said cylinder to said second position, the actuation of all of said at least two pyrotechnic charges corresponding to a second output level for said moving means and causing said piston to be moved from said first position, said second output level for said moving means being higher than said first output level;

sensing means for sensing at least one characteristic of the occupant of the vehicle seat; and controlling means operatively connected to said sensing means for controlling the actuation of said moving means based on the sensed characteristic of the occupant.

11. The apparatus as set forth in claim 10 wherein said first and second output levels for said moving means correspond to respective first and second levels of force being applied to the seat belt webbing which in turn correspond to respective first and second levels of force imposed on the occupant by the seat belt webbing.

12. The apparatus as set forth in claim 10 wherein said sensing means senses the weight of the occupant and provides a signal to said controlling means indicative of the sensed weight of the occupant.

13. The apparatus as set forth in claim 10 wherein said sensing means senses the height of the occupant and provides a signal to said controlling means indicative of the sensed height of the occupant.

14. The apparatus as set forth in claim 10 wherein said sensing means senses the position of the occupant in the vehicle seat and provides a signal to said controlling means indicative of the sensed position of the occupant.

15. The apparatus as set forth in claim 10 wherein said sensing means includes means for sensing the weight of the occupant, means for sensing the height of the occupant, and means for sensing the position of the occupant in the vehicle seat;

said controlling means being operable to (i) receive signals from said sensing means indicative of the weight, the height and the position of the occupant, (ii) determine which of said first and second output levels for said moving means is appropriate for the occupant, and (iii) actuate said moving means in accordance with the determined appropriate output level.

16. The apparatus as set forth in claim 10 wherein said at least two pyrotechnic charges are located adjacent to each other and at right angles to an axial centerline of said cylinder.

17. The apparatus as set forth in claim 10 wherein said at least two pyrotechnic charges are arranged parallel to an axial centerline of said cylinder.

18. The apparatus as set forth in claim 10 wherein said at least two pyrotechnic charges are equally circumferentially spaced about said cylinder.

* * * * *